United States Patent
Kennedy, Jr.

(10) Patent No.: US 6,830,380 B2
(45) Date of Patent: Dec. 14, 2004

(54) THRUST BEARING ASSEMBLY WITH PRELOAD SPRING

(75) Inventor: Joseph F. Kennedy, Jr., Winsted, CT (US)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/934,906

(22) Filed: Aug. 22, 2001

(65) Prior Publication Data

US 2002/0031289 A1 Mar. 14, 2002

Related U.S. Application Data

(60) Provisional application No. 60/232,287, filed on Sep. 13, 2000.

(51) Int. Cl.$^7$ ................................................. F16C 9/30
(52) U.S. Cl. ....................................... 384/462; 384/620
(58) Field of Search ................................ 384/462, 476, 384/620

(56) References Cited

U.S. PATENT DOCUMENTS

| 2,891,828 A | 6/1959 | Winchell |
| 3,268,279 A | 8/1966 | Greby |
| 3,317,014 A | 5/1967 | Pitner |
| 3,934,956 A | 1/1976 | Pitner |
| 3,972,574 A | 8/1976 | Pitner |
| 4,313,644 A | 2/1982 | Dagiel |
| 4,462,608 A | 7/1984 | Lederman ................ 280/668 |
| 4,533,263 A | 8/1985 | McGuffie |
| 4,699,530 A | 10/1987 | Satoh et al. ................ 384/609 |
| 4,725,153 A * | 2/1988 | Tsuru ....................... 384/620 |
| 4,907,899 A | 3/1990 | Rhoads |
| 4,968,157 A * | 11/1990 | Chiba ....................... 384/462 |
| 5,199,802 A | 4/1993 | Shinohara et al. |
| 5,344,241 A | 9/1994 | Wells |
| 5,435,655 A | 7/1995 | Wells |
| 6,036,373 A | 3/2000 | Faass et al. |

FOREIGN PATENT DOCUMENTS

| GB | 2022723 | 12/1979 |
| GB | 2147957 | 5/1985 |
| GB | 2248475 | 4/1992 |
| GB | 2250064 | 5/1992 |

* cited by examiner

Primary Examiner—Matthew C. Graham
(74) Attorney, Agent, or Firm—Michael Best & Friedrich LLP

(57) ABSTRACT

Two thrust races are separated by a plurality of rolling elements for relative rotation of the thrust races about a common axis. A spring washer is positioned axially outward of the two thrust races for engaging a support surface and for applying an axial load to one of the two thrust races. The two thrust races, the rolling elements and the spring washer are retained together as an assembly, for example by an axially extending case with radially extending lips, to facilitate handling and installation of the thrust bearing assembly.

14 Claims, 2 Drawing Sheets

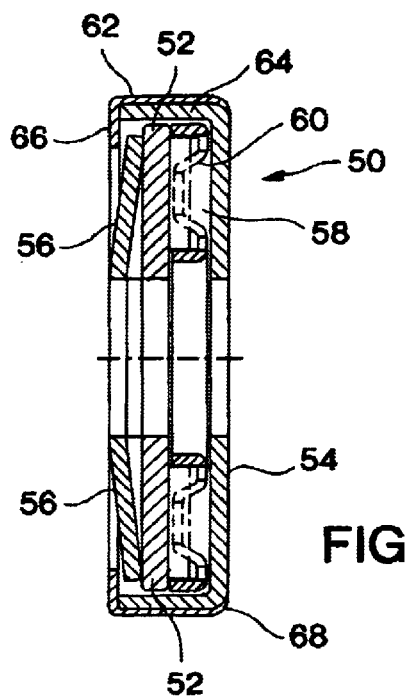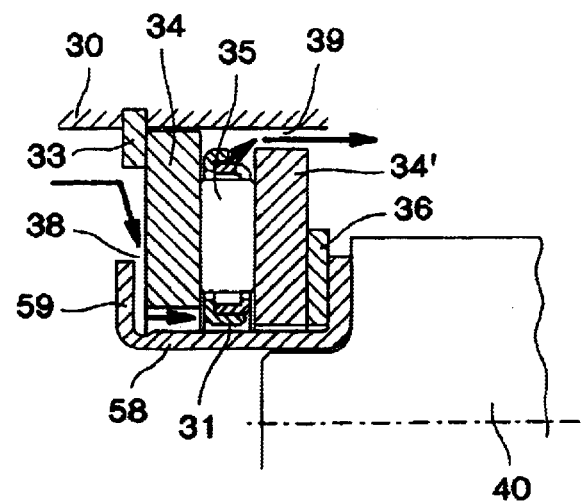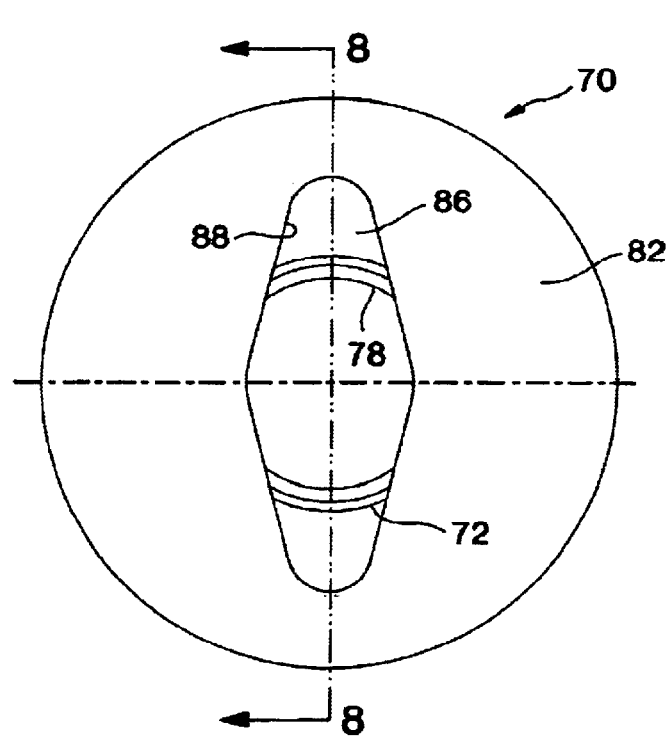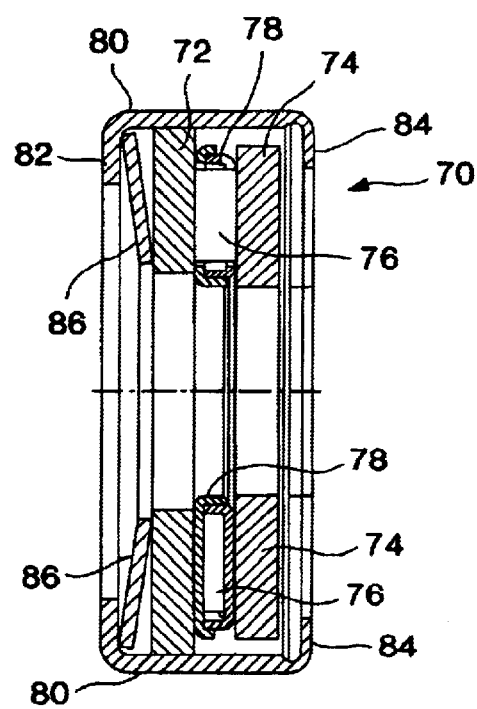
FIG. 6
FIG. 5
FIG. 7
FIG. 8

THRUST BEARING ASSEMBLY WITH PRELOAD SPRING

This application claims benefit of Provisional Application 60/232,287 filed Sep. 13, 2000.

BACKGROUND OF THE INVENTION

This invention relates generally to thrust bearings and, more particularly, to thrust bearings used with springs to provide preload and thrust bearings with enhanced flow of lubricant.

Many thrust bearing applications, for example, air conditioning compressors, rely upon thrust bearings to provide preload for rotors and shafts to maintain design clearances. Lubrication of such bearings may be provided by a refrigerant/lubricant mixture, which generally has inferior lubrication properties than pure lubricants. In most cases, the components of such thrust bearing are installed separately, directly into the compressor. In addition to being a tedious and expensive operation, this separate installation procedure introduces risks of contamination, component misalignment, and even omission of some thrust bearing components.

FIGS. 1 and 2 illustrate a thrust bearing configuration according to current practice, before and after application of an axial load, respectively. Such loads are applied during assembly of an air compressor to stabilize the axial position of the compressor shaft. In general, the environment of the thrust bearing consists of a housing 10 in which a stepped diameter or a snap ring 13 in a groove is situated to act as a support for the thrust bearing components. A spring washer 16 is positioned adjacent one of two thrust races 14 that are separated by rolling elements 15 that are guided by a bearing cage 11.

An air conditioning compressor shaft 20 has a shoulder 12 against which one thrust race 14 rests, such that when a sufficient axial preload is applied to the compressor shaft, the spring washer 16 is compressed as illustrated in FIG. 2. As can be seen in the Figure, the bearing cage 11 and the thrust races 14 are piloted on the compressor shaft 20 so that there is radial clearance 17 between the thrust races 14 and the housing 10 but little radial clearance 18 between the thrust races 14 and the shaft 20. The arrows in FIG. 2 indicate that the supply of refrigerant/lubricant mixture supplied to the clearance 18 is adequate, but the amount that reaches the clearance 17 is substantially reduced. This reduced refrigerant/lubricant supply may not provide the required amount of lubrication for protection of the thrust bearing from wear, overheating, and build-up of contaminant.

In addition to problems of inadequate flow of refrigerant/lubricant, thrust bearing performance in such applications may be degraded due to cross piloting of the thrust races 14 between the compressor shaft 20 and the housing 10. This is apparent in FIG. 2, in which the retaining snap ring 13, the spring washer 16, and the thrust race 14 are in face-to-face contact. The thrust race that is piloted on the compressor shaft 20 is intended to rotate with the shaft, and the washer 16 and snap ring 13 are restrained by the housing 10. The rotation of the thrust race 14 is frictionally resisted by the spring washer 16, rotation of which, in turn, is frictionally resisted by the snap ring 13. This piloting arrangement leads to increased wear between the components. In the worst case, the retaining snap ring 13 may be driven by the spring washer 16 to turn in the housing and eventually slip out of the groove in which it is installed due to wear. When combined with the inadequate lube flow already described, the build-up of wear contaminant in the thrust bearing progresses at an increasing rate and may lead to premature thrust bearing failure.

The foregoing illustrates limitations known to exist in present thrust bearing configurations. Thus, it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a thrust bearing assembly comprising two thrust races, a plurality of rolling elements between and against the two thrust races, for facilitating relative rotation of the thrust races about a common axis, and a spring washer. The spring washer is axially outward of the two thrust races for engaging a support surface and for applying a preload to a first of the two thrust races. Retention means retains the two thrust races, the rolling elements and the spring washer together as an assembly to facilitate handling and installation.

The foregoing and other aspects will become apparent from the following detailed description of the invention when considered in conjunction with the accompanying drawings.

BRIEF DESCRIPTION OF THE DRAWINGS

FIG. 5 is a sectional view of a portion of an installed thrust bearing configuration with an axial load applied, illustrating a second embodiment of thrust bearing assembly of the present invention;

FIG. 6 is a sectional view of a thrust bearing assembly illustrating a third embodiment of the present invention; and FIGS. 7 and 8 are axial and sectional views, respectively, as indicated by the line 8—8 of FIG. 7, of a thrust bearing assembly illustrating a fourth embodiment of the present invention.

DETAILED DESCRIPTION

Figure 1:
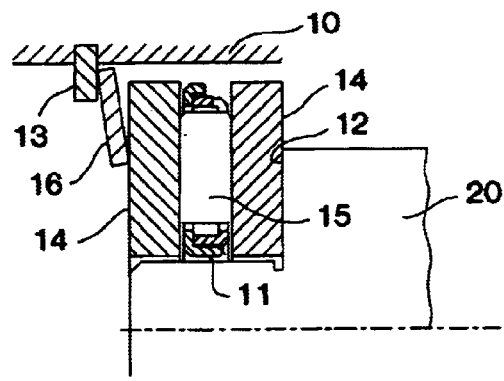
FIG. 1 is a sectional view of a portion of an installed thrust bearing configuration, with no axial load applied, illustrating the prior art.
Figure 2:
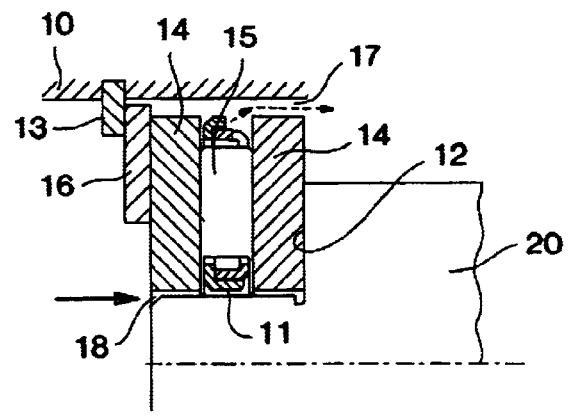
FIG. 2 is a sectional view of a portion of the installed thrust of FIG. 1, with an axial load applied.
Figure 3:
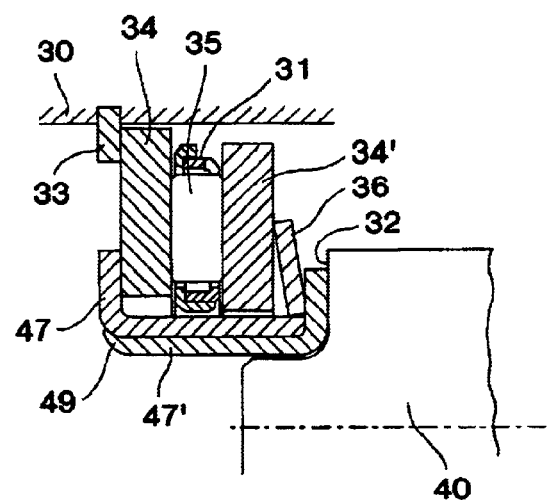
FIGS. 3 and 4 are sectional views of a portion of an installed thrust bearing configuration, illustrating a first embodiment of thrust bearing assembly of the present invention, before and after application of an axial load, respectively.
Figure 4:
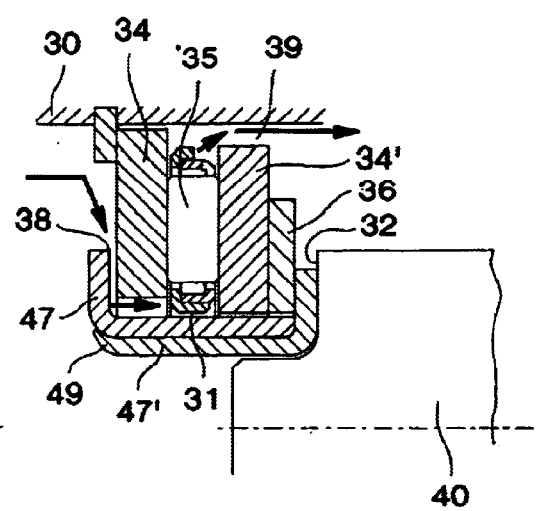

A thrust bearing assembly according to the present invention is illustrated in FIGS. 3 and 4, which illustrate the bearing assembly installed with no applied axial load and with an applied axial load, respectively.

This embodiment of the present invention comprises a plurality of rolling elements 35 retained and guided by a cage 31, a housing-piloted thrust race 34, a case-piloted thrust race 34', a spring washer 36, and two axially extending case halves 47, 47' that are nested and fixed together by stakes, a rolled edge or other fixing means 49. When installed in a housing 30, the housing-piloted thrust race 34 rests against a snap ring 33. Shaft 40 is inserted into case half 47' with shoulder 32 abutting a radial extension of case half 47'.

When a designed axial load is applied to the shaft 40, the spring washer 36 deflects as shown in FIG. 4, and the case 47, 47' is displaced axially to open a gap 38 between housing-piloted thrust race 34 and case half 47. This provides a generous lubricant flow path through the bearing and out through gap 39 between the housing 30 and the shaft-piloted thrust race 34'. This also reduces the cross-piloting problems encountered in the prior art since the housing-piloted thrust race 34, which rests against the stationary snap ring 33 during operation, does not contact the bearing case half 47, that rotates with the shaft. As a result, frictional wear is greatly reduced.

FIG. 3 illustrates that the thrust bearing assembly of the present invention may provide an axial preload by sizing the axial length of case halves 47, 47' so that, when assembled and fixed by the staked or rolled edge 49, or other unitizing method, the spring washer 36 is preloaded against the thrust race 34 and, thereby, against all other thrust bearing assembly components. This preload prevents rattling and vibration between the components during shipping and handling and thereby reduces fretting that might otherwise result.

FIG. 5 illustrates a second embodiment of thrust bearing assembly of the present invention that is similar to the previously described embodiment but has a single-piece case 58 in place of two-piece case 47, 47'. Case 58 has a flange 59 rolled, spun or otherwise formed after insertion of the spring washer 36, the case-piloted race thrust 34', the rolling elements 35 and bearing cage 31, and the housing-piloted thrust race 34. This assembly is shown under axial load.

Note that the snap ring 33 may be replaced by a stepped housing bore as determined by manufacturing and cost considerations. Also, note that the thrust bearing assembly of the present invention has been illustrated with a case that is positioned radially inward of the thrust races and against the shaft. The case may also be positioned radially outward of the thrust races and against the housing, with a shaft-piloted thrust race supported against a step on the shaft. This is easily visualized by viewing FIGS. 3–5 as having a housing 40 surrounding a shaft 30.

FIG. 6 illustrates another embodiment of the present invention. Thrust bearing assembly 50 comprises shaft-piloted thrust race 52, housing-piloted thrust race 54, spring washer 56, rollers 58 within a Sigma-type bearing cage 60, and case 62. Thrust race 54 includes an axially extending flange 64 that allows case 62 to be made of thinner material that is more easily formed with radially inwardly extending lips 66, 68 that restrain axially outward movement of spring washer 56 and thrust race 54. Spring washer 56 is Belleville spring with a conical cup facing axially inward.

FIGS. 7 and 8 illustrate another embodiment of the present invention. Thrust bearing assembly 70 has housing-piloted thrust race 72, shaft-piloted thrust race 74, rollers 76 within a box-type bearing cage 78. Case 80 is formed as a drawn cup, with an apertured bottom portion 82, and a staked or spun lip 84, formed after thrust bearing assembly 70 is assembled. Spring washer 86 is a Belleville spring with a conical cup facing axially outward. Aperture 88 in the bottom portion 82 is a modified diamond shape, with rounded ends and sides, and is designed to provide adequate flow of lubricant.

As illustrated in FIGS. 3, 4, 5, and 8, the shaft-piloted thrust races may have outer and inner diameters that are smaller, respectively, than those of the housing-piloted thrust races. As a result, the case of the thrust bearing assembly does not close the path of lubricant identified at numerals 38 and 33 of FIGS. 4 and 5. This path for lubricant can be controlled by varying the amount of axial preload applied to the thrust bearing assembly.

The present invention results in a bearing assembly that reduces cross-piloting of components, improves lubricant flow, reduces wear of piloting surfaces, allows potential control of lubricant flow by application of a varying axial force, prevents rattling and associated wear during shipping, and allows a radius in place of a grind relief between a piloting shaft and a step or shoulder, resulting in a stronger shaft. And, of course, the use of a unitized assembly including a spring washer, in place of separate bearing and spring components, speeds installation, reduces expense and reduces errors in alignment of components.

Having described the invention, what is claimed is:

1. A thrust bearing assembly comprising:
   two thrust races;
   a plurality of rolling elements between and against the two thrust races, for supporting relative rotation of the thrust races about a common axis;
   a spring washer axially outward of the two thrust races for engaging a support surface and for applying a preload to a first of the two thrust races; and
   retention means for retaining the two thrust races, the rolling elements and the spring washer together as an assembly to facilitate handling and installation and wherein the two thrust races, the rolling elements and the spring washer are configured to have zero axial clearance within the retention means, prior to installation of the thrust bearing assembly, such that damage from vibration during handling is reduced.

2. A thrust bearing assembly according to claim 1, wherein the retention means comprises an axially extending case positioned radially inward or radially outward of the two thrust races, the rolling elements and the spring washer, to restrain radial movement thereof; and wherein the case has radially extending portions engageable with the spring washer and a second of the two thrust races to restrain axially outward movement of the spring washer and the second thrust race.

3. A thrust bearing assembly according to claim 2, wherein at least some of the radially extending portions engageable with the spring washer or thrust race are formed by staking.

4. A thrust bearing assembly according to claim 2, wherein the case comprises a drawn cup with a lip extending radially and engageable with the spring washer to restrain axially outward movement of the spring washer.

5. A thrust bearing assembly according to claim 4, wherein the case includes a second lip extending radially and engageable with the second thrust race.

6. A thrust bearing assembly according to claim 5, wherein the case is formed of two drawn cups that overlap, forming a cylindrical double-wall portion.

7. A thrust bearing assembly according to claim 5, wherein the case is formed of a single drawn cup.

8. A thrust bearing assembly according to claim 5, wherein the case comprises a drawn cup with an apertured bottom portion extending radially and engageable with the spring washer to restrain axially outward movement of the spring washer.

9. A thrust bearing assembly according to claim 1, wherein the spring washer comprises a Belleville spring having a conical cup facing axially outward from the thrust races.

10. A thrust bearing assembly according to claim 1, wherein the spring washer comprises a Belleville spring having a conical cup facing axially inward toward the thrust races.

11. A thrust bearing assembly according to claim 1, wherein the rolling elements are rollers retained within a bearing cage.

12. A thrust bearing assembly according to claim 11, wherein the bearing cage is of a box-type configuration.

13. A thrust bearing assembly according to claim 11, wherein the bearing cage is of a sigma-type configuration.

14. A thrust bearing assembly comprising:

two thrust races;

a plurality of rolling elements between and against the two thrust races, for supporting relative rotation of the thrust races about a common axis;

a spring washer axially outward of the two thrust races for engaging a support surface and for applying a preload to a first of the two thrust races; and retention means for retaining the two thrust races, the rolling elements and the spring washer together as an assembly to facilitate handling and installation and wherein a first of the thrust races has an outer diameter smaller than the outer diameter of a second of the thrust races, to facilitate flow of lubricant, and wherein the first thrust race has an inner diameter smaller than the inner diameter of the second thrust race, to facilitate flow of lubricant.

* * * * *

UNITED STATES PATENT AND TRADEMARK OFFICE
CERTIFICATE OF CORRECTION

PATENT NO. : 6,830,380 B2
DATED : December 14, 2004
INVENTOR(S) : Joseph F. Kenney, Jr.

It is certified that error appears in the above-identified patent and that said Letters Patent is hereby corrected as shown below:

Title page,
Item [12], delete "Kennedy, Jr.", and replace with -- Kenney, Jr. --.
Item [75], Inventors, delete "Joseph F. Kennedy, Jr.", and replace with -- Joseph F. Kenney, Jr. --.

Signed and Sealed this

First Day of March, 2005

JON W. DUDAS
*Director of the United States Patent and Trademark Office*